US010966058B1

(12) United States Patent
Pai et al.

(10) Patent No.: US 10,966,058 B1
(45) Date of Patent: Mar. 30, 2021

(54) SYSTEM AND METHOD OF OPERATING A COMMUNICATION DEVICE TO PROVIDE LOCATION INFORMATION WITHIN STATUS NOTIFICATION MESSAGES

(71) Applicant: MOTOROLA SOLUTIONS, INC., Chicago, IL (US)

(72) Inventors: Madhusudan Pai, Frisco, TX (US); Sayyad Gaffar, Bhilai (IN); Prakashkumar Raval, Bangalore (IN); Jay Nagarjuna Manekonda, Bangalore (IN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/807,369

(22) Filed: Mar. 3, 2020

(51) Int. Cl.
| H04W 24/00 | (2009.01) |
| H04W 4/029 | (2018.01) |
| H04W 4/02 | (2018.01) |
| H04W 68/08 | (2009.01) |
| G06K 9/62 | (2006.01) |
| H04W 68/00 | (2009.01) |
| H04W 4/12 | (2009.01) |

(52) U.S. Cl.
CPC .......... *H04W 4/029* (2018.02); *G06K 9/6215* (2013.01); *H04W 4/025* (2013.01); *H04W 4/12* (2013.01); *H04W 68/005* (2013.01); *H04W 68/08* (2013.01)

(58) Field of Classification Search
CPC ..... H04W 64/00; H04W 76/007; H04W 4/22; H04W 4/02; H04W 4/12; H04W 8/18; H04W 4/025; H04W 68/005; H04W 68/08; H04M 11/04; H04M 2242/04; H04M 1/72547; H04M 3/537; G08B 25/016; G06K 9/6215
USPC ......... 455/404.1, 404.2, 412.2, 414.2, 456.1, 455/456.5, 456.6
See application file for complete search history.

(56) References Cited

U.S. PATENT DOCUMENTS

| 2006/0128395 | A1 | 6/2006 | Muhonen |
| 2013/0288692 | A1* | 10/2013 | Dupray ..................... G01S 5/02 455/450 |
| 2018/0053394 | A1* | 2/2018 | Gersten .................. G06F 9/453 |
| 2018/0295556 | A1* | 10/2018 | Baek ....................... H04L 63/08 |
| 2019/0014440 | A1* | 1/2019 | Vega ........................ G01S 5/00 |

(Continued)

FOREIGN PATENT DOCUMENTS

| WO | 2014153568 A1 | 9/2014 |
| WO | 2017156368 A1 | 9/2017 |

*Primary Examiner* — Temica M Beamer
(74) *Attorney, Agent, or Firm* — Raguraman Kumaresan

(57) ABSTRACT

A process for operating a communication device to provide location information within status notification messages. The communication device detects a status notification event and responsively retrieves, from a memory, a last known location of the communication device and a timestamp of the last known location. The communication device generates a status notification message including a status code corresponding to a detected status of a user of the communication device, the last known location of the communication device, the timestamp of the last known location, and a unique identifier identifying the status notification message. The status notification message is then transmitted from the communication device to at least one other communication device or a status notification server.

19 Claims, 3 Drawing Sheets

(56) References Cited

U.S. PATENT DOCUMENTS

| | | | | |
|---|---|---|---|---|
| 2019/0166480 A1* | 5/2019 | Rauner | ............. | H04W 4/023 |
| 2019/0261145 A1* | 8/2019 | South | ............. | H04W 4/021 |
| 2019/0348176 A1* | 11/2019 | Swank | ............. | H04M 1/72572 |
| 2020/0296540 A1* | 9/2020 | Grube | ............. | H04L 51/32 |

* cited by examiner

SYSTEM AND METHOD OF OPERATING A COMMUNICATION DEVICE TO PROVIDE LOCATION INFORMATION WITHIN STATUS NOTIFICATION MESSAGES

BACKGROUND

Some organizations require their employees to report their status periodically or whenever requested. Employees may use their mobile devices to manually enter and share status information to their supervisors and team members. Some technologies allow such devices to automatically gather status information for the user and share such information to predefined recipients. Some organizations, for example, public safety agencies, may have policies requiring their officers who may deal with dangerous situations to report status information immediately when requested. Such policies may require officers to report their status within a particular time period. However, there are some technical limitations with respect to immediately obtaining and reporting certain types of status information within the time period required by the policy.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
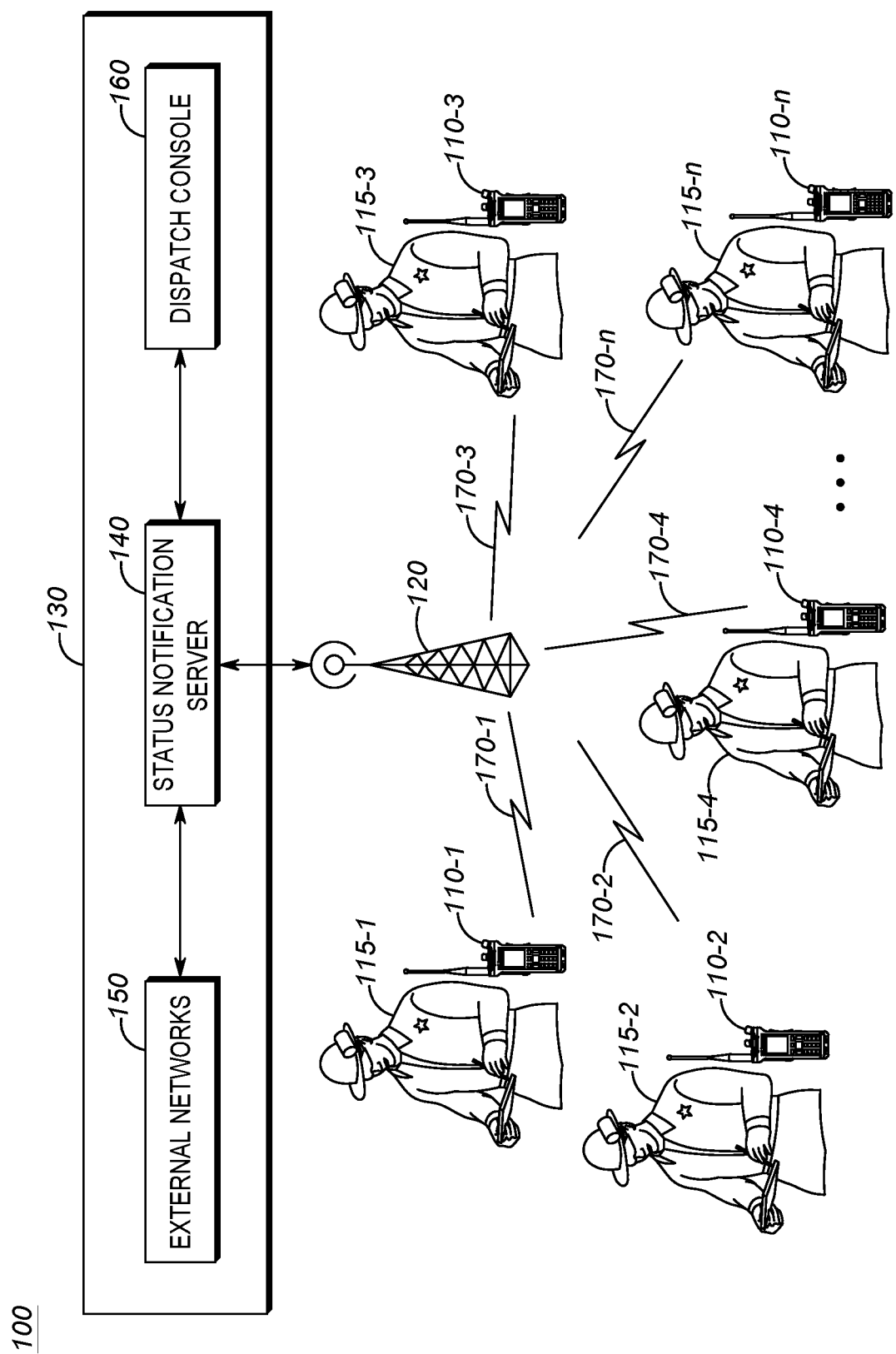
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, some organizations have policies that require status information to be immediately reported from user devices in response to an event that requires reporting such status information. Such policies are electronically configured on communication devices operated by the users to ensure that the communication devices automatically transmit status notification messages as soon as a status notification event requiring transmission of such status notification messages is detected at the communication device.

Land mobile radios (LMR), often operated by public safety users, include a feature called operational status messaging (OSM) that provides for reporting status information via narrowband channels. OSM feature allows status codes to be configured per communication group corresponding to certain tasks (e.g., when the user has arrived at an incident scene, or the user is en route to a target location, or the user has completed a certain assigned task etc.,) performed by a public safety user. However, LMR standard does not provide for including location information along with the status codes within the status notification message. The embodiments described herein address this issue by including location information along with the status codes within the status notification message.

Third generation partnership project (3GPP) standard allows a similar feature called "Enhanced Status Messaging" (ESM) that provides for reporting of status information on broadband channels as part of 3GPP Mission Critical Data (McData) services. A status notification event triggering the transmission of status notification message is detected at the communication device when the user invokes the OSM or ESM feature via a hard button press (e.g., a hardware key mapped on the device for invoking the OSM or ESM feature) or via a user interface implemented on a client application at the communication device.

Some organizations, for example, public safety agencies, may require implementation of status notification message features (e.g., OSM and ESM features) on communication devices operated by their officers with stringent key performance indicators (KPI) for both message timing and location reporting parameters. In such cases, communication devices are electronically provisioned with policies that require device location to be reported along with along with status codes in the event notification message. The policies further require transmission of a status notification message immediately in response to detecting a status notification event at the device. However, this poses an issue on certain communication devices, for example, devices operating on broadband channels, where retrieving location of the communication device from location determination devices such as a global positioning system (GPS) takes order of several seconds or tens of seconds or where the device platform is not configured to provide location information unless a significant location change occurs. So, communication devices either have to delay transmitting the status notification message to meet the location reporting requirement (i.e., of including the location information within the status notification message) or alternatively have to immediately transmit the status notification message without the location information to meet the message timing requirement. Therefore, in such cases, operation of the communication devices will need to be modified to meet the KPI requirements set by organizations in terms of message timing and location reporting.

Disclosed is an improved process of operating the communication devices that provide location information within status notification messages while adhering to the message timing and location reporting requirements in response to a status notification event detected at the communication devices.

One embodiment provides a method of operating a communication device to provide location information within status notification messages. The method includes: detecting a status notification event and responsively retrieving, from a memory, a last known location of the communication device and a timestamp of the last known location; generating a status notification message including a status code corresponding to a detected status of a user of the communication device, the last known location of the communication device, the timestamp of the last known location, and a unique identifier identifying the status notification message; and transmitting the status notification message to at least one other communication device or a status notification server.

Another embodiment provides a communication device including a memory for storing a last known location of the communication device; a location determination device configured to determine a current location of the communication device; a wireless transceiver; and an electronic processor communicatively coupled to the memory, the location determination device, and the wireless transceiver. The electronic processor is configured to: detecting a status notification event and responsively retrieving, from the memory, the last known location of the communication device and a timestamp of the last known location; generating a status notification message including a status code corresponding to a detected status of a user of the communication device, the last known location of the communication device, the timestamp of the last known location, and a unique identifier identifying the status notification message; and transmitting, via the wireless transceiver, the status notification message to at least one other communication device or a status notification server.

Each of the above-mentioned embodiments will be discussed in more detail below, starting with example system and device architectures of the system in which the embodiments may be practiced, followed by an illustration of processing blocks for achieving an improved technical method, device, and system for operating a communication device to provide location information within status notification messages. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a communication system 100 is shown including a plurality of communication devices 110-1 through 110-n, a base station 120, and an infrastructure radio access network (RAN) 130 including a status notification server 140, external networks 150, and a dispatch console 160. The plurality of communication devices 110-1 through 110-n can be interchangeably referred to, collectively, as communication devices 110, and generically as a communication device 110. The communication device 110 may be associated with or subscribed to one or more groups for transmitting to and/or receiving status notification messages from other communication devices 110 in the group. The communication devices 110-1 through 110-n may be operated by respective users 115-1 through 115-n (for example, a public safety responder), generically referred to as user(s) 115 or group member(s) 115. The users 115 may carry or wear the respective communication devices 110, such as a battery-powered portable radio used for narrowband and/or broadband direct-mode or infrastructure communications, a battery-powered radio speaker microphone (RSM) video capture device, and vehicular radios. Each communication device 110 may include one or more wireless communication interfaces for communicating with a base station 120 and/or directly with one or more other communication devices 110 in the system 100.

The base station 120 and infrastructure RAN 130 works in tandem to provide infrastructure wireless communication services to served communication devices 110 that are within a wireless transmission range of the base station 120. While infrastructure RAN 130 is illustrated in FIG. 1 as including a status notification server 140, external networks 150, and a dispatch console 160, in other embodiments, RAN infrastructures may contain a subset of such components or may contain a superset of such components. For example, infrastructure RAN 130 may include one or more elements such as additional base stations, base station controllers, router, switches, gateways, and the like, arranged, connected, and programmed to provide wireless service to communication devices 110. The communication system 100 could take the form of a public-safety radio network, a commercial broadband network, or a private network (e.g., WiFi network).

The status notification server 140 may be, for example, a radio controller, push-to-talk (PTT) server, zone controller, mobile management entity (MME), base station controller (BSC), mobile switching center, site controller, call controller, or other network device. While the status notification server 140 is illustrated as a separate entity in the system 100, the status notification server 140 may be integrated with other devices (such as a zone controller) in the infrastructure RAN 130 and/or within BS 120. The status notification server 140 may be configured to provide registration, authentication, encryption, routing, and/or other services to communication devices 110 operating within the coverage area of the base station 120, in addition to further features and functions disclosed herein. In accordance with some embodiments, the status notification server is configured to receive status notification messages from communication devices 110 and further route such status notification messages to other entities (e.g., communication devices 110, dispatch console 160 etc.,) within the system 100. The status notification server 140 may additionally track or have access to group subscription information. The group subscription information identifies each group by a unique group identifier. In accordance with some embodiments, the group is configured with a set of authorized group members that can receive status notification messages such as operational status messages. Each group is associated with a plurality of communication devices 110, where a status notification message transmitted by a particular communication device 110 is automatically routed to every other communication device 110 in the same group or to the configured set of authorized group members that can receive operational status messages. Each communication device 110 may be identified in the group subscription information by a device identifier (ID) such as a hardware ID, hardware Media Access Control (MAC) address, Internet Protocol (IP) address, radio ID, International Mobile Subscriber Identity (IMSI), a serial number, user ID, or some other unique identifier that can be used to identify subscribed member communication devices or users.

External networks 150 may be made accessible to communication devices 110 via infrastructure RAN 130. External networks 150 may include, for example, a public switched telephone network (PSTN), a plain old telephone (POT) system, a wide-area packet-switched network such as the Internet, or another wired or wireless service provider's network, among other possibilities.

Dispatch console 160 may be directly coupled to the status notification server 140, as shown, or may be indirectly coupled to the status notification server 140 via one or more internal or external networks. The dispatch console 160 allows an administrator or dispatcher at a dispatch console to initiate infrastructure-sourced communications to communication devices 110, among other features and functions. In accordance with some embodiments, the dispatch console 160 may also automatically request and/or receive status notification messages from one or more communication devices 110. Further, the dispatch console 160 may be added to one or more groups of communication devices 110 to automatically receive status notification messages transmitted by communication devices in the group.

Infrastructure RAN 130 and base station 120 may implement one or more radio access technologies (RATs) and may communicate with communication devices 110 over respective air-interface links 170-1 through 170-*n* (collectively referred to as air-interface link or links 170) according to the one or more RATs. Example RATs include a direct-mode, conventional, or infrastructure-mode trunked land-mobile-radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RATs operate in accordance with standard and/or protocols such as Long Term Evolution (LTE), LTE-Advance, or 5G protocol including multimedia broadcast multicast services (MBMS) or single site point-to-multipoint (SC-PTM) over which runs an open mobile alliance (OMA) push to talk (PTT) over cellular (OMA-PoC), a 3GPP MCPTT application, a voice over IP (VoIP), an LTE Direct or LTE Device to Device, or a PTT over IP (PoIP) application. While FIG. 1 illustrates an example in which all communication devices 110 use the same RAT, in other embodiments, each communication device 110 or set of communication devices 110 may use different RATs to communicate with one or more same or different infrastructure RAN.

Downlink communications over air-interface links 170 may be addressed to communication devices 110 (e.g., multicast or broadcast using an identifier, such as a Subscriber Group ID (SGID), that is associated with a group), and/or to one or more single communication devices (e.g., unicast using an identifier, such as a Subscriber Unit Identifier (SUID), that is uniquely associated with that communication device 110), among other possibilities that are known to those of skill in the art. In addition to infrastructure wireless air-interface links 170 communicatively coupling the communication devices 110 to the infrastructure RAN 130 via the base station 120, communication devices may also maintain ad-hoc or direct-mode ("ad-hoc") air-interface links 170 without any intervening infrastructure between them. For example, the communication device 110-1 may be wirelessly coupled to communication device 110-2 via a direct-mode air interface link (not shown) in accordance with one or more direct-mode air-interface protocols, such as Bluetooth, near field communication (NFC), Infrared Data Association (IrDA), ZigBee, direct-mode land-mobile-radio (LMR), and/or Wi-Fi Direct, as long as the devices are within mutual transmission range of one another. In some embodiments, the communication system 100 allows communication devices 110 to exchange status notification messages with each other and to other devices in the system 100 without the messages being routed through the status notification server 140.

In accordance with some embodiments, the communication devices 110 are electronically configured with policies that require the communication devices 110 to meet the message timing and location reporting requirements in the event of transmitting status notification messages. In some embodiments, status notification messages may be transmitted in accordance with OSM feature available in LMR standard and McData ESM features available in 3GPP standard. In accordance with some embodiments, the policies may require communication devices 110 to immediately generate and transmit status notification messages (e.g., operational status messages) along with location information and status codes indicating a user status whenever a status notification event is locally detected (e.g., via a user input received at the communication device 110, via a signal received from an authorized external device such as dispatch console 160, or via a trigger generated based on sensor events) at the communication device 110.

In some embodiments, for each status notification event detected at the communication device 110, a communication device 110 may transmit two status notification messages, i.e., a first status notification message including a last known location of the communication device that is retrieved from a local memory implemented at the communication device 110 and a second status notification message including a current location of the communication device 110 that is retrieved from a location determination device. Transmitting a first status notification message including the last known location of the communication device 110 immediately (i.e., without any delay) in response to detecting the status notification event ensures that the communication device 110 meets both the location and timing requirements of the KPIs set by the agencies. In addition, transmitting an updated status notification message including a current location of the communication device 110 as and when the location determination device determines and provides the current location of the communication device 110, ensures that a target recipient (i.e., a communication device 110 or another authorized device such as a dispatch console 160 that receives and processes the status notification message) has an accurate location of the communication device 110.

Figure 2:
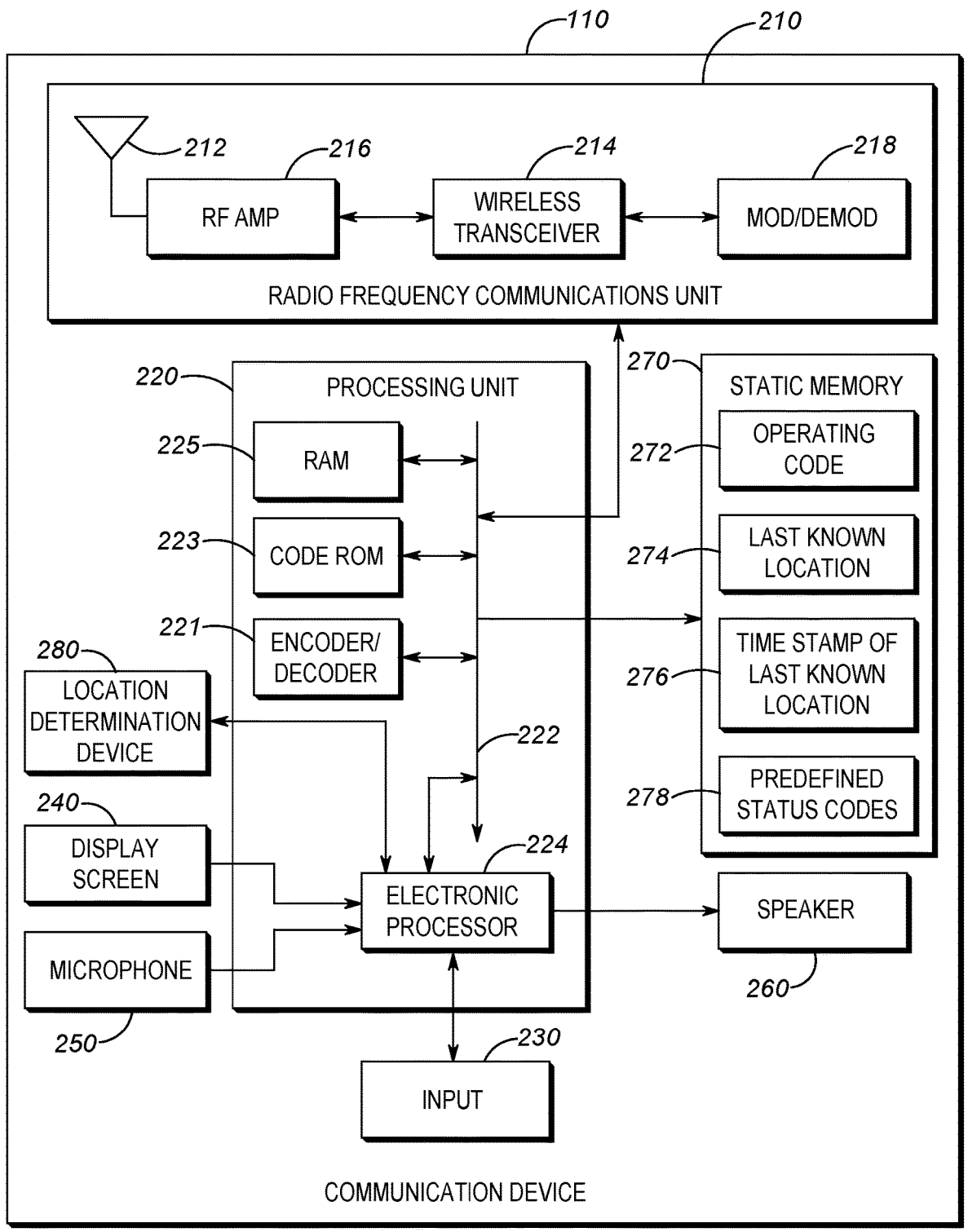
FIG. 2 is a block diagram of a communication device shown in FIG. 1 in accordance with some embodiments.

FIG. 2 is an example functional block diagram of a communication device 110 operating within the communication system 100 in accordance with some embodiments. While FIG. 2 represents a communication device 110 described above with respect to FIG. 1, depending on the type of communication device 110, the communication device 110 may include fewer or additional components in configurations different from that illustrated in FIG. 2.

As shown in FIG. 2, the communication device 110 includes a radio frequency communications unit 210 coupled to a common data and address bus 222 of a processing unit 220. The communication device 110 may also include an input 230 and a display screen 240, each coupled to be in communication with processing unit 220. The input 230 may include an alphanumeric physical keypad (or virtual keypad in cooperation with capacitive touch display screen 240) for inputting text for communications. In accordance with some embodiments, the input 230 may include a suitable interface, for example, a hardware or graphical user interface button or key that the user can press to invoke a status notification event for transmitting a status notification message to a target recipient such as one or more other communication devices 110 or dispatch console 160 in the system 100. In some embodiments, the input 230 may include a push-to-talk (PTT) key that functions to activate a transmit function in a half or full-duplex communication device, transitioning the communication device 110 (when activated) from a listen-only mode to a transmit-only mode (for half-duplex communication devices) or transmit and receive mode (for full-duplex communication devices). The display screen 240 may further function to display communications including status notification messages received via communications unit 210 from other communication devices. A microphone 250 captures speech input from a user 115 that is further vocoded by processing unit 220 and transmitted as voice, text, or multimedia data by communications unit 210 to other communication devices in the system 100. A communications speaker 260 reproduces audio that is decoded from voice data transmissions received from other communication devices via the communications unit 210.

The communication device 110 further includes a location determination device 280 that determines a current location of the communication device in response to a request received from the processing unit 220. In accordance with some embodiments, the processing unit 220 may transmit the request to the location determination device 280 when it detects a status notification event (that triggers transmission of a status notification message) at the communication device 110. The location determination device 280 may include a satellite receiver (e.g., a global positioning system (GPS) receiver, Global navigation satellite system (GLONASS) receiver, etc.,) that determines the location of the communication device 110 based on one or more signals received from the satellites. The location determination device 280 may also be implemented using other technologies, for example, a wireless fidelity (WiFi) positioning system that uses triangulation of WiFi signals received from multiple wireless access points for a given position of the communication device 110 to determine the location of the communication device 110 and a cellular positioning system that uses cellular information from base stations to determine the location of the communication device 110. Accordingly, the current location may be determined as one or more of a street address, an intersection, a global positioning system (GPS) location, an elevation, a triangulated location, a uniquely identified structure (such as a particular subway, train line, road, building, or building floor), a location coordinate, or some other form of location identifier.

The processing unit 220 also includes an encoder/decoder 221 with an associated code Read Only Memory (ROM) 223 for storing data for initializing system components and encoding and/or decoding voice or other traffic information (including image data, audio data, video data, text data, control signals, etc.) that may be transmitted or received by the communication device 110. The processing unit 220 may further include an electronic processor 224 coupled, by the common data and address bus 222, to the encoder/decoder 221, a random access memory (RAM) 225, and a static memory 270.

The radio frequency communications unit 210 is a combined receiver and transmitter (e.g., transceiver) having a common antenna 212. The radio frequency communications unit 210 has a transceiver 214 coupled to the antenna 212 via a radio frequency amplifier 216. The transceiver 214 may be a transceiver operating in accordance with one or more standard protocols, such as a digital mobile radio (DMR) transceiver, a Project 25 (P25) transceiver, a terrestrial trunked radio (TETRA) transceiver, a Bluetooth transceiver, a long term evolution (LTE) transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 214 is also coupled to a combined modulator/demodulator (MOD/DEMOD) 218 that is coupled to the encoder/decoder 221.

The electronic processor 224 has ports for coupling to the input 230 and to the display screen 240. The electronic processor 224 further has ports for coupling to the microphone 250 and to the speaker 260. The electronic processor 224 may include a microprocessor, a logic circuit, an application-specific integrated circuit (ASIC), a field-programmable gate array (FPGA), or another suitable electronic device. In some embodiments, the static memory 270 may store operating code 272 for the electronic processor 224 that, when executed by the electronic processor 224, perform one or more of the operations set forth in FIG. 3 and accompanying text. Static memory 270 may comprise, for example, a hard disk drive (HDD), an optical disk drives (ODD) such as a compact disk (CD) drive or digital versatile disc (DVD) drive, a solid-state drive (SSD), a tape drive, a flash memory drive, or a tape drive, to name a few.

The static memory 270 further stores a last known location of the communication device 110 and a timestamp indicating a time at which the last known location of the communication device 110 was determined. In one embodiment, the location determination device 280 periodically determines a current location of the communication device 110 and updates it (i.e., overwriting the previously stored last known location) in the memory 270 as a last known location of the communication device 110. In another embodiment, the location determination device 280 initiates a procedure to determine a current location of the communication device 110 whenever the processing unit 220 detects a status notification event (for transmitting a status notification message) and requests the location determination device 280 to determine the current location of the communication device 110. When the location determination device 280 determines the current location of the communication device 110, the processing unit 220 (e.g., via the electronic processor 224) retrieves the current location of the communication device 110 from the location determination device 280 and further updates it (i.e., overwriting the previously stored last known location) in the memory 270 as the last known location of the communication device 110.

In accordance with some embodiments, when the processing unit 220 detects a status notification event, the processing unit 220 immediately retrieves the last known location from the memory 270 and further generates a status notification message for transmission to other communication devices 110 or status notification server 140 in response to the status notification event. In these embodiments, the processing unit 220 also requests the location determination device 280 to determine a current location of the communication device 110 in response to the status notification event. However, the processing unit 220 includes the last known location retrieved from the memory 270 instead of the current location that is to be retrieved from the location determination device 280. This is because a communication device 110 may have a configured policy that requires status notification messages to be immediately sent in response to detecting the status notification event and further because there is a time delay between requesting the location determination device 280 to determine the current location and receiving the determined current location from the location determination device 280. Further, in these embodiments, when the communication device 110 receives the current location of the communication device 110 after the delay (i.e., after the location determination device 280 completes the process of determining a current location of the communication device 110), the communication device subsequently generates and transmits a second status notification message (also referred to as updated status notification message) including the current location of the communication device 110 as received from the location determination device 280. Sending a second status notification message after the first status notification message in response to detecting the same status notification event ensures that the recipient of the status notification message has an accurate location of the communication device 110. In addition, sending the first status notification message including the last known location retrieved from the memory 270 immediately in response to the status notification event satisfies the message timing and location reporting requirements of the electronic policy configured at the communication device 110.

In accordance with some embodiments, the memory 270 further stores a plurality of predefined status codes, where each code is mapped to a particular status message. When a status notification event is detected at the communication device 110, the communication device 110 generates a status notification message by retrieving, from the plurality of predefined status codes, a particular predefined status code (e.g., status code "3005") that is mapped to a detected status of the user (e.g., user has arrived at an incident scene) of the communication device 110. The status notification message is then transmitted including the retrieved status code. Similarly, when the communication device 110 receives a status notification event including a status code from another communication device, the communication device 110 retrieves a particular status message corresponding to the status code included in the status notification event and then provides a visual/audio output (via the display screen 240/speaker 260) indicating the status message corresponding to the retrieved status code.

Figure 3:
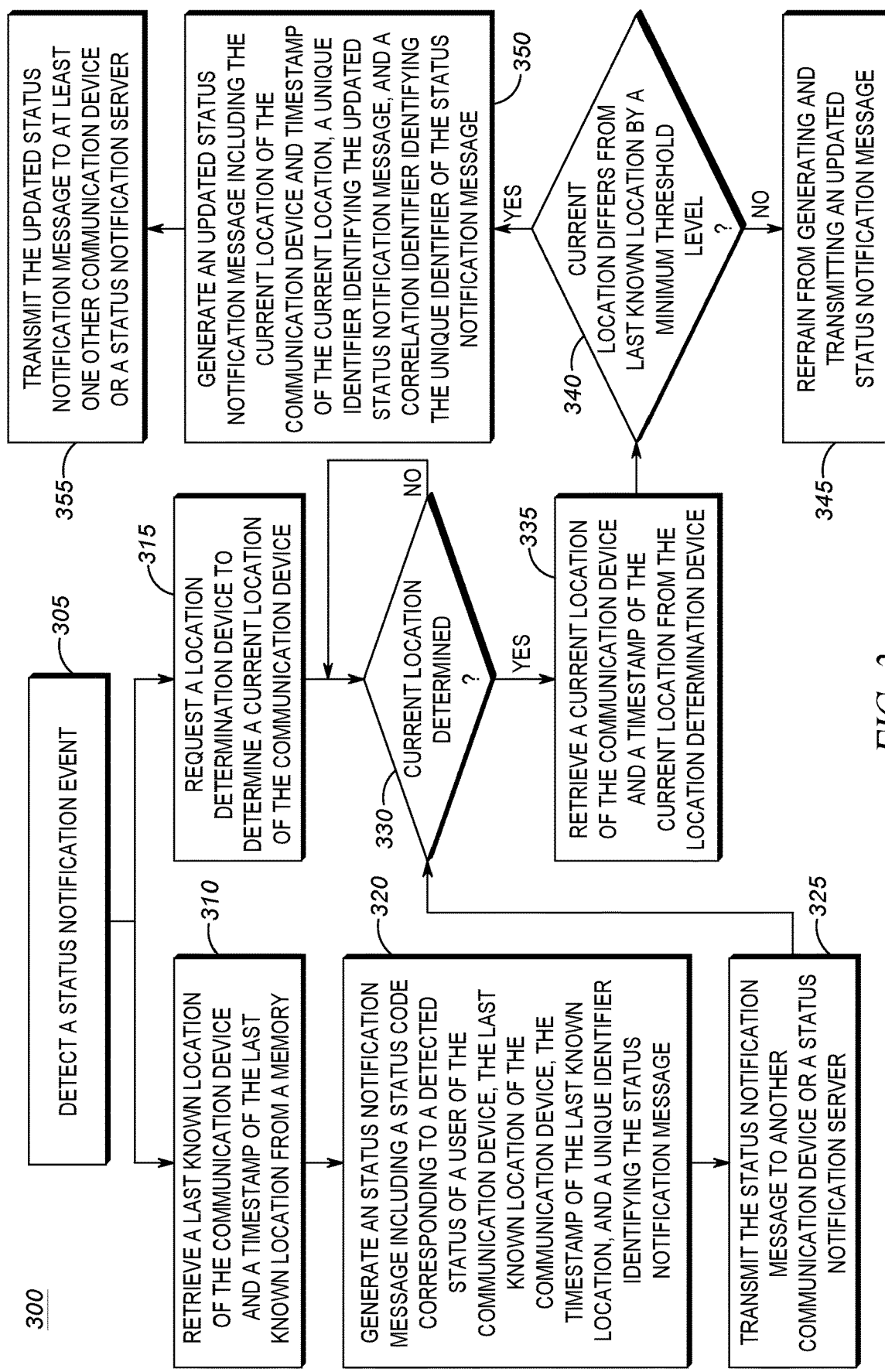
FIG. 3 illustrates a flowchart of a method of operating a communication device to provide location information within status notification messages in accordance with some embodiments.

Turning now to FIG. 3, a flowchart diagram illustrates a process 300 for operating a communication device to provide location information within status notification messages in accordance with some embodiments. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. A communication device 110 shown in FIG. 1 and/or FIG. 2, and embodied as a singular computing device or distributed computing device may execute process 300 via an electronic processor 224 implemented at the communication device 110. The communication device 110 may execute the process 300 at power-on, at some predetermined periodic time period thereafter, in response to a trigger raised locally at the device via an internal process or via an input interface (e.g., the user enabling a particular feature such as OSM or ESM feature associated with the process 300 by interacting with the input 230), or in response to a trigger from an accessory (e.g., sensors) or an authorized external device such as a dispatch console 160 to which the communication device 110 is communicably coupled, among other possibilities.

The process 300 of FIG. 3 need not be performed in the exact sequence as shown and likewise various blocks may be performed in different order or alternatively in parallel rather than in sequence. For example, the blocks 310 and 315 may be concurrently executed by the electronic processor 224 of the communication device 110 in response to detecting a status notification event at block 305. The process 300 may be implemented on variations of the system 100 of FIG. 1 as well.

Process begins at block 305 where the communication device 110 detects a status notification event. The status notification event may be a local event detected at the communication device 110 when a user of the communication device 110 invokes the status notification messaging feature by interacting with a suitable input interface (e.g., input 230) implemented at the communication device 110. Alternatively, the status notification event may be locally generated when a request for status notification message is received from an external authorized device (e.g., from a dispatcher via a dispatch console 160). In accordance with some embodiments, the status notification event may also be detected at the communication device 110 when analysis of sensor data obtained from one or more sensors (e.g., a sensor-enabled holster, a biometric sensor etc.,) that are communicatively coupled to the communication device 110 indicates a predefined condition that requires reporting of status information. For example, the sensor-enabled holster may provide state information regarding a weapon and/or other item normally disposed within the user's sensor-enabled holster. When the analysis of data received from the sensor-enabled holster indicates a change in state and/or an action relative to the weapon (e.g., removal of the weapon) normally disposed within the sensor-enabled holster, a status notification event may be generated at the communication device 110. As another example, when analysis of data (e.g., indications of orientations, direction, steps, acceleration, and/or speed, and indications of health such as one or more of a captured heart rate, a captured breathing rate, and a captured body temperature of the user) received from a biometric sensor indicates a problem with user's health, a status notification event may be generated at the communication device 110. In other embodiments, a status notification event may also be automatically generated at the communication device when a particular task assigned to the user (e.g., interviewing the witnesses, generating an incident report) is completed or to periodically indicate a current status of the user and/or status of the task assigned to the user (e.g., when a first responder arrives at an incident scene, accepts the incident assignment, or is en route to the incident scene etc.)

Next, at block 310, the communication device 110 retrieves a last known location of the communication device 110 and a timestamp of the last known location from the memory 270 of the communication device 110. In accordance with some embodiments, status notification policies electronically configured at the communication device 110 (e.g., by a system administrator affiliated with a public safety agency) may require the communication device 110 to transmit a status notification message without any time delay when a status notification event is detected at the communication device 110. In this case, since there is an inherent time delay involved with respect to requesting the location determination device to determine an updated location of the communication device 110 and further retrieving the updated location from the location determination device 280, the communication device 110 immediately retrieves the last known location that was already stored at the memory 270 in response to detecting the status notification event.

In accordance with some embodiments, the communication device 110, responsive to detecting the status notification event at block 305 and concurrently to retrieving the last known location from the memory 270 at block 310, further requests the location determination device 280 to initiate a procedure for determining the current location of the communication device 110 at block 315. In response, the location determination device 280 initiates the procedure for determining the current location of the communication device 110. However, since there is a delay (e.g., in the order of several seconds/tens of seconds) associated with determining the updated location of the communication device 110 by the location determination device 280, the communication device 110, instead of waiting to receive the updated location information from the location determination device 280, immediately (i.e., in response to status notification event detected at block 305) proceeds to execute the functions described at blocks 320 and 325 before it determines whether the updated location of the communication device 110 is determined by the location determining device 280 and available for retrieval by the communication device 110.

Next, at block 320, the communication device 110 generates a status notification message that includes a status code corresponding to a detected status of a user of the communication device 110, the last known location of the communication device 110 and timestamp of the last known location as retrieved from the memory 270 at block 305, and a unique identifier (e.g., represented in 16 octets) that uniquely identifies the status notification message that is being generated in response to a particular status notification event. In accordance with some embodiments, the status codes may correspond to one or more predefined status codes as configured in the communication device 110. Each status code may be mapped to a particular status message indicating a particular user status. As non-limiting examples, a status code "3005" may be mapped to a status message that indicates the user of the communication device 110 is en route to an incident scene, a status code "3006" may be mapped to a status message that indicates the user of the communication device 110 has arrived at an incident scene, and a status code "3007" may be mapped to a status message that indicates a weapon status (e.g., removal of weapon from the officer's holster). In accordance with some embodiments, when the communication device 110 detects a status notification event, the communication device 110 immediately detects a user status and further retrieves, from the memory 270, a particular status code that is mapped to a status message matching the user status. In this case, the retrieved status code corresponding to the detected user status is included in the generated status notification event. In some embodiments, the communication device 110 may also include more than one status codes, for example, a first status code to indicate that the user has arrived at the incident scene and a second status code to indicate that a weapon is removed from the officer's holster.

Next, at block 325, the communication device 110 (e.g., device 110-1) transmits, via the wireless transceiver 214, the status notification message to at least one other communication device (e.g., device 110-2) or a status notification server 140. In one embodiment, the communication device 110 transmits the status notification message to the status notification server 140 which then routes the status notification message to other communication devices 110 that are members of the same communication group as the transmitting communication device 110. In another embodiment, the communication device 110 may directly transmit the status notification message to one or more other communication devices 110 in accordance with direct mode communication protocols.

When the at least one other communication device 110 receives the status notification message, the communication device 110 may retrieve a status message corresponding to the status code and may provide a visual or audio output corresponding to the status message. For example, when the received status notification message includes a status code "3006," the communication device 110 retrieves a status message "user has arrived at the incident scene" that is mapped to the status code "3006" at the memory 270 and further displays (e.g., via display screen 240) or provides an audio output (e.g., via speaker 260) corresponding to the retrieved status message. In some embodiments, the communication device 110 receiving the status notification message may display a map indicating the last known location of the communication device 110.

At block 330, the communication device 110, after transmitting the status notification message in response to the detected status notification event, determines whether the location determination device 280 has determined the current location of the communication device 110. For example, the location determination device 280 may provide a signal indicating that the location determination device 280 has determined the current location of the communication device 110. In case no signal indicating the determination of the updated location is received from the location determination device 280, the communication device 110 waits until it receives a signal indicating that the current location has been determined by the location determination device 280. When the communication device 110 receives a signal indicating that the location determination device 280 has determined the current location of the communication device 110, the communication device 110 proceeds to block 335 and retrieves, from the location determination device 280, the current location of the communication device 110 and a timestamp indicating a time at which the current location was determined by the location determination device 280.

Next, at block 340, the communication device 110 determines whether the current location of the communication device 110 retrieved from the location determination device 280 differs from the last known location retrieved from the memory 270 by a minimum threshold level. The minimum threshold level may be predefined by the agencies and further configured at the communication device 110. In other embodiments, the minimum threshold may be dynamically adjusted depending on the user status that is detected in response to the status notification event. For example, a status code indicating no user movement may necessitate close monitoring of the user locations. In this case, the minimum threshold level may be reduced so that even a minor difference between the current location and the last known location may cause the communication device 110 to generate and transmit an updated status notification message as described in blocks 350 and 355. In any case, when the current location and the last known location does not differ by a minimum threshold level, the communication device 110 refrains from generating and transmitting an updated status notification message in response to the detected status notification message as shown in block 345. In one embodiment, the communication device 110 stores log information at the memory 270 and/or transmits log information to a remote server such as the status notification server 140 indicating that the updated status notification is not transmitted either because the current location matches the last known location or because there is a minimal difference (i.e., less than the minimum threshold level) between the current location and the last known location.

On the other hand, when it is determined, at block 340, that the current location differs from the last known location by the minimum threshold level, the communication device 110 proceeds to block 350 and generates an updated status notification message including the current location of the communication device 110 and time stamp of the current location as retrieved from the location determination device 280, a unique identifier identifying the updated status notification message, and a correlation identifier that identifies the unique identifier of the status notification message generated at block 320. Including a correlation identifier to identify the status notification message indicates to the recipient (e.g., communication device 110-2) that the updated status notification message is sent in response to the same status notification event as the previously sent status notification message and further the updated status notification message includes an updated location of the communication device 110 that may be different from the last known location of the communication device 110 included in the previously received status notification message. In one embodiment, the communication device 110 includes a location offset instead of the actual current location of the communication device 110 in the updated status notification message. The location offset is determined based on a relative difference (e.g., distance) between the current location and the last known location.

Next, at block 355, the communication device 110 transmits, via the wireless transceiver, the updated status notification message to the at least one other communication device (e.g., communication device 110-2) or the status notification server 140. In one embodiment, the communication device 110 transmits the updated status notification message to the status notification server 140 which then routes the updated status notification message to other communication devices that are members of the same communication group as the transmitting communication device or alternatively to authorized subset of group members in the communication device. In another embodiment, the communication device 110 may directly transmit the updated status notification message to one or more other communication devices in accordance with direct mode communication protocols.

When the at least one other communication device (e.g., communication device 110-2) receives the updated status notification message, the communication device 110-2 may display a map output identifying the current location of the transmitting communication device 110-1. In one embodiment, the map output may show both the last known location as well as the current location of the communication device 110-1. For example, the map may show a first visual indicator (e.g., a yellow indicator) to indicate the last known location and a second visual indicator (e.g., green indicator) to indicate the current location. In case there is a significant difference (e.g., determined based on whether the current location differs from the last known location by a maximum threshold level) between the current location and the last known location, the map output may provide an additional visual indicator indicating the significant location change relative to the last known location. In accordance with some embodiments, when the at least one other communication device receives an updated status notification message, the at least one other communication device logs the information included in the updated status notification message, locally or at a remote server, for future evidentiary purposes.

In one alternative embodiment, after retrieving the current location and timestamp of the current location at block 335, the communication device 110 bypasses the execution of function described in block 340 and instead generates and transmits the updated status notification message including current location retrieved from the location determination device 280 (as described in blocks 350 and 355). In other words, in this embodiment, the communication device 110 transmits the updated status notification message irrespective of whether the current location and last known location differs by a minimum threshold level or not. In these embodiments, the communication device 110 transmits, for each detected status notification event, a first status notification message including a last known location retrieved from the memory 270 as shown in block 325 and a second status notification event (i.e., updated status notification message) including an updated location (i.e., current location) retrieved from the location determination device 280 as shown in block 355.

In another alternative embodiment, when the communication device 110 retrieves the last known location of the communication device 110 and a timestamp of the last known location from the memory at block 310, the communication device 110 further compares the timestamp of the last known location with a current time (i.e., a time at which the status notification event is detected). In particular, the communication device 110 determines whether the timestamp of the last known location is within a threshold time period (e.g., 5 seconds) relative to the current time. If the communication device determines that the timestamp of the last known location is within a threshold time period relative to the current time, then the communication device 110 includes a special indicator in the status notification message generated at block 320. The special indicator provides an indication that an updated status notification message including an updated current location of the communication device 110 in response to the status notification event will not be provided to the at least one other communication device or server. In other words, in this embodiment, when the time difference between the time at which the last known location was determined and the current time is minimal, the communication device 110 determines that there is no need to send an updated status notification message because there will be minimal or no change between the undetermined current location (i.e., if it were to be requested and received from the location determination device) and the last known location retrieved from the memory 270. Accordingly, in this embodiment, when there is minimal time difference between timestamp of last known location and current timestamp, the communication device 110 refrains from executing the functions described in blocks 315 and blocks 330 through 355. In addition, in this embodiment, the communication device 110 stores log information at the memory 270 and/or transmits log information to a remote server such as the status notification server 140 indicating that the updated status notification will not be generated and/or transmitted because of the minimal time difference between the timestamp of the last known location and the current time. On the other hand, when the communication device 110 determines that the last known location is not within the threshold time period relative to the current time, the communication device 110 requests the location determination device 280 to determine a current location of the communication device 110 as shown in block 315 and further performs the functions described in block 330 through 355 to transmit an updated status notification message in case the current location differs from the last known location by a minimum threshold level.

As should be apparent from this detailed description, the operations and functions of the communication device are sufficiently complex as to require their implementation on a computer system, and cannot be performed, as a practical matter, in the human mind. Communication devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot determine accurate location of the communication device, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of operating a communication device to provide location information within status notification messages, the method comprising:
    detecting a status notification event and responsively retrieving, from a memory, a last known location of the communication device and a timestamp of the last known location;
    generating a status notification message including a status code corresponding to a detected status of a user of the communication device, the last known location of the communication device, the timestamp of the last known location, and a unique identifier identifying the status notification message;
    transmitting the status notification message to at least one other communication device or a status notification server;
    responsive to detecting the status notification event and concurrently to retrieving the last known location, requesting a location determination device to determine a current location of the communication device;
    receiving a signal indicating that the location determination device has determined the current location of the communication device and responsively retrieving the current location of the communication device and a timestamp of the current location from the location determination device;
    generating an updated status notification message including the current location of the communication device, the timestamp of the current location, a second unique identifier identifying the updated status notification messaging, and a correlation identifier that identifies the unique identifier of the status notification message; and
    transmitting the updated status notification message to the at least one other communication device or the server.

2. The method of claim 1, wherein the last known location corresponds to a location of the communication device that was determined by the location determination device prior to detecting the status notification event.

3. The method of claim 1, wherein the information corresponding to the current location of the communication device includes one of (i) the current location of the communication device, (ii) a location offset that is determined based on the current location and the last known location, or (iii) an indicator indicating that the current location is same as the last known location.

4. The method of claim 1, wherein prior to generating the updated status notification message, the method further comprising:
    determining whether the current location differs from the last known location by a minimum threshold level; and
    refraining from generating and transmitting the updated status notification message when the current location does not differ from the last known location by the minimum threshold level.

5. A method of operating a communication device to provide location information within status notification messages, the method comprising:
    detecting a status notification event and responsively retrieving, from a memory, a last known location of the communication device and a timestamp of the last known location;
    generating a status notification message including a status code corresponding to a detected status of a user of the communication device, the last known location of the communication device, the timestamp of the last known location, and a unique identifier identifying the status notification message;
    determining whether the timestamp of the last known location is within a threshold time period relative to a current time at which the status notification event is detected;
    when the timestamp of the last known location is within the threshold time period relative to the current time, including a special indicator in the status notification message to indicate that an updated status notification message including an updated location of the communication device in response to the status notification event will not be provided to the at least one communication device or the server; and
    transmitting the status notification message to at least one other communication device or a status notification server.

6. The method of claim 5, wherein when the timestamp of the last known location is not within the threshold time period relative to the current time, the method further comprising:

requesting a location determination device, to determine a current location of the communication device;

receiving a signal indicating that the location determination device has determined the current location of the communication device and responsively retrieving the current location of the communication device and a timestamp of the current location from the location determination device;

generating an updated status notification message including information corresponding to the current location of the communication device, the timestamp of the current location, a second unique identifier identifying the updated status notification messaging, and a correlation identifier that identifies the unique identifier of the status notification message; and transmitting the updated status notification message to the at least one other communication device or the server.

7. The method of claim 1, wherein the status notification event is detected in response to a user input received at the communication device, the user input indicating a request to send a status of a user of the communication device.

8. The method of claim 1, wherein the status notification event is detected in response to a signal received from a dispatch console indicating a request to send a status of the user of the communication device.

9. The method of claim 1, wherein the status notification event is detected in response to identifying a predefined condition based on an analysis of sensor data obtained from one or more sensors that are communicatively coupled to the communication device.

10. The method of claim 1, wherein the status notification message includes an indicator indicating that the last known location corresponds to a location that was determined prior to detecting the status notification event.

11. The method of claim 1, wherein the status notification message corresponds to an operational status message (OSM) transmitted in accordance with land mobile radio (LMR) standard.

12. The method of claim 1, wherein the status notification message corresponds to a mission critical data (McData) enhanced status message (ESM) transmitted in accordance with Third Generation Partnership Project (3GPP) standard.

13. A communication device, comprising:

a memory for storing a last known location of the communication device and a timestamp of the last known location;

a location determination device configured to determine a current location of the communication device;

a wireless transceiver; and an electronic processor communicatively coupled to the memory, the location determination device, and the wireless transceiver, the electronic processor configured to:

detect a status notification event and responsively retrieving, from the memory, a last known location of the communication device and the timestamp of the last known location;

generate a status notification message including a status code corresponding to a detected status of a user of the communication device, the last known location of the communication device, the timestamp of the last known location, and a unique identifier identifying the status notification message;

transmit, via the wireless transceiver, the status notification message to at least one other communication device or a status notification server;

request, responsive to detecting the status notification event and concurrently to retrieving the last known location, the location determination device to determine a current location of the communication device;

receive a signal indicating that the location determination device has determined the current location of the communication device and responsively retrieving the current location of the communication device and a timestamp of the current location from the location determination device;

generate an updated status notification message including information corresponding to the current location of the communication device, the timestamp of the current location, a second unique identifier identifying the updated status notification messaging, and a correlation identifier that identifies the unique identifier of the status notification message; and transmit, via the wireless transceiver, the updated status notification message to the at least one other communication device or the server.

14. The communication device of claim 13, wherein the last known location corresponds to a location of the communication device that was determined by the location determination device prior to detecting the status notification event.

15. The communication device of claim 13, wherein the information corresponding to the current location of the communication device includes one of (i) the current location of the communication device, (ii) a location offset that is determined based on the current location and the last known location, or (iii) an indicator indicating that the current location is same as the last known location.

16. The communication device of claim 13, wherein the electronic processor is configured to:

determine, prior to generating the updated status notification message, whether the current location differs from the last known location by a minimum threshold level; and refrain from generating and transmitting the updated status notification message when the current location does not differ from the last known location by the minimum threshold level.

17. The communication device of claim 13, wherein the status notification message includes an indicator indicating that the last known location corresponds to a location that was determined prior to detecting the status notification event.

18. The communication device of claim 13, wherein the status notification message corresponds to one of: an operational status message (OSM) transmitted in accordance with land mobile radio (LMR) standard or a mission critical data (McData) enhanced status message (ESM) transmitted in accordance with Third Generation Partnership Project (3GPP) standard.

19. A method of operating a communication device to provide location information within status notification messages, the method comprising:

detecting a status notification event and responsively retrieving, from a memory, a last known location of the communication device and a timestamp of the last known location;

generating a status notification message including a status code corresponding to a detected status of a user of the communication device, the last known location of the communication device, the timestamp of the last known location, and a unique identifier identifying the status notification message;

transmitting the status notification message to at least one other communication device or a status notification server;

generating an updated status notification message including a correlation identifier that identifies the unique identifier identifying the status notification message transmitted previously in response to detecting the status notification event; and transmitting the updated status notification message to the at least one other communication device or the status notification server.

* * * * *